Jan. 4, 1966  E. DORMAN  3,226,897
GRIP CLIP FASTENER
Filed July 5, 1962  2 Sheets-Sheet 1
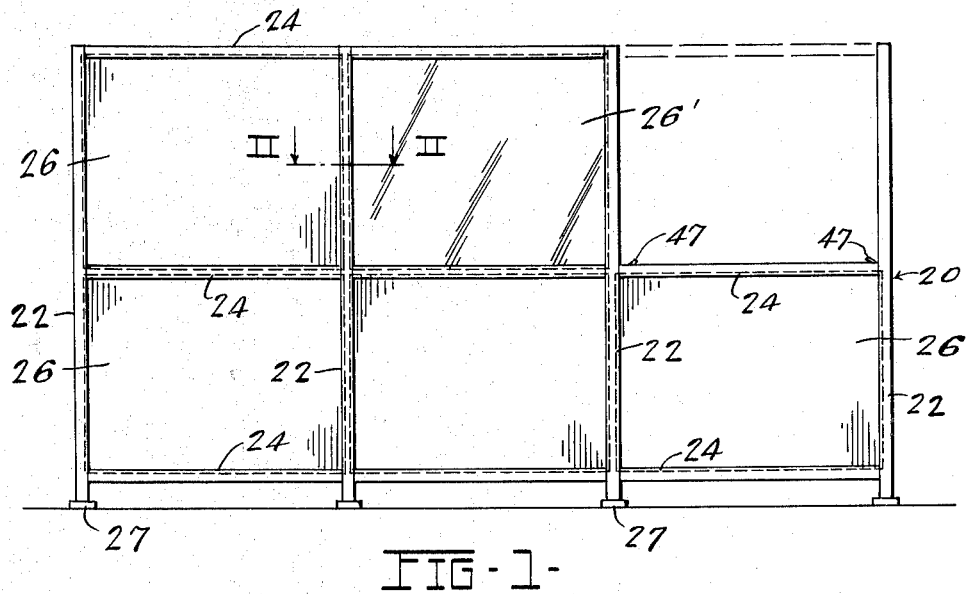
FIG-1-
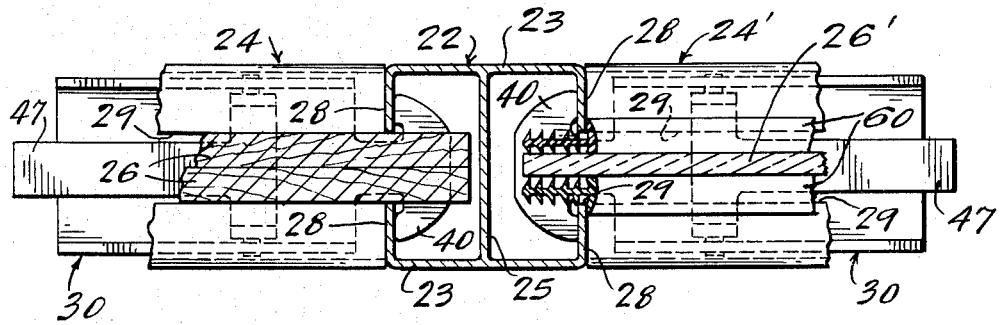
FIG-2-
INVENTOR:
ERWIN DORMAN.
BY
ATT'Y.

Jan. 4, 1966     E. DORMAN     3,226,897
GRIP CLIP FASTENER
Filed July 5, 1962     2 Sheets-Sheet 2
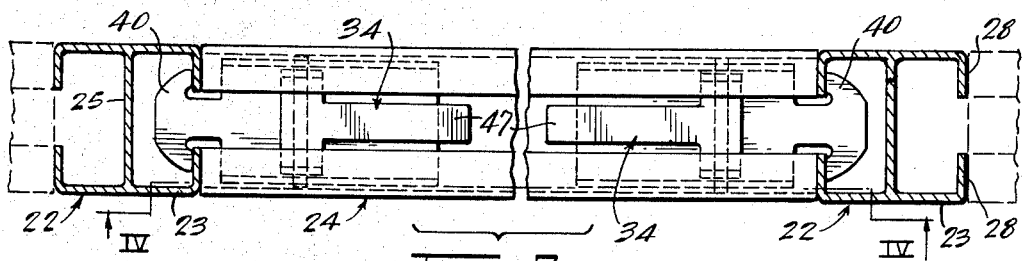
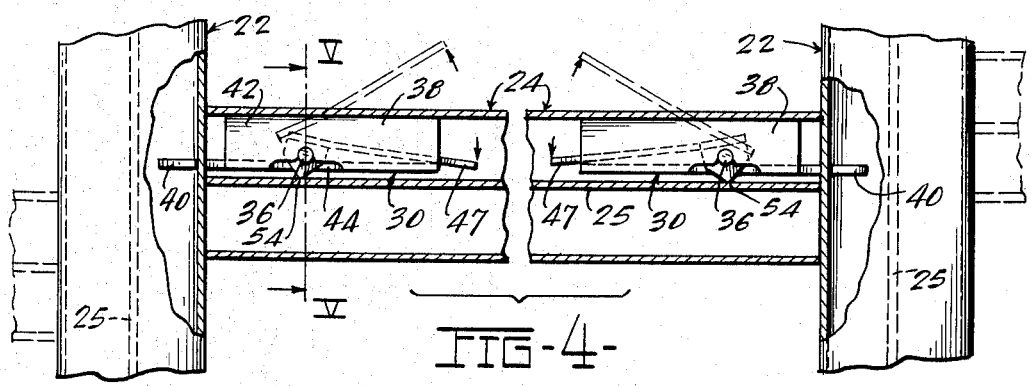
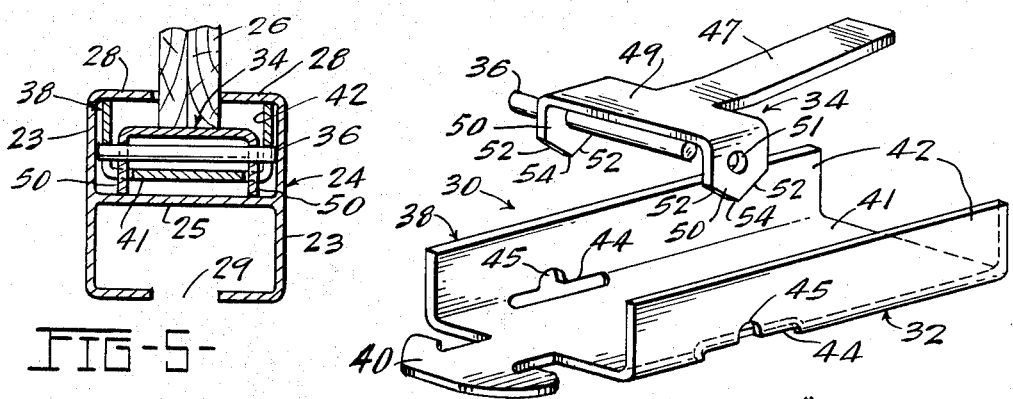
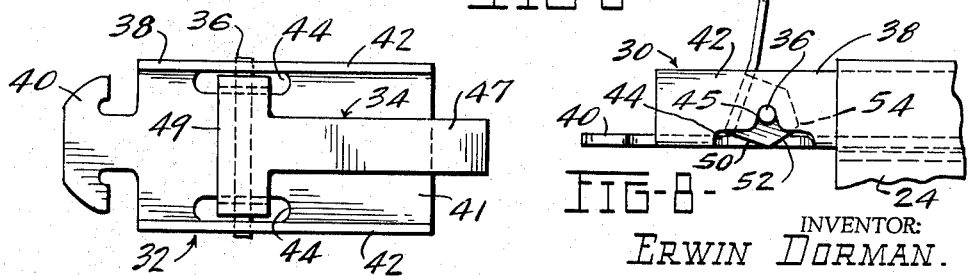
INVENTOR:
ERWIN DORMAN.
BY
ATT'Y.

United States Patent Office 3,226,897
Patented Jan. 4, 1966

3,226,897
GRIP CLIP FASTENER
Erwin Dorman, 3704 Cherrywood Lane, Toledo, Ohio
Filed July 5, 1962, Ser. No. 207,733
9 Claims. (Cl. 52—475)

This invention relates to fastening means and is particularly directed to means for fastening C-section channels together at an angle to each other.

An object of the invention is to provide a clamping means having channel engaging portions with cam means for drawing angularly disposed channels into engagement and securing them together at any one of an infinite number of locations along the abutting channel members.

Another object of the invention is to provide fastening means for partitions and the like installations which permit assembly or dis-assembly without the use of special tools.

Another object of the invention is to provide a fastener with a minimum of easily assembled parts arranged to be maintained in assembly by the structure with which it is used.

Another object of the invention resides in the provision of means for clamping a fastener in fastening position so that the clamping means is retained by at least a part of the supported structure.

Another object of the invention is to provide a partition with a frictional fastening means for securing vertical and horizontal channel members in position to form a rectangular frame having a substantially continuous inwardly open panel seating groove for receiving a panel in position to engage the fastening means and retain the same in fastening position.

Generally speaking the present invention comprises a supporting frame structure for partition panels including pairs of vertical and horizontal channel shaped members assembled to receive and support such panels and means to fasten the frame members together at right angles in the form of a gripping or clamping member having a body portion of U-shaped channel section from the plane of the base of which a hook portion projects. The body portion is received in the end of one of the channel members with the hook portion projecting therefrom into and behind the flanges of the other channel member. Pivoted to the projecting parallel sides or edges of the body member is a cam member having an operating lever projecting therefrom, the cam portion projecting through slots in the base of the body into engagement with the base of the channel in which it is mounted simultaneously to clamp the fastener to such channel and pull the other channel into engagement therewith; the cam portion being toothed to bite into the channel base when the lever is depressed. The lever is held in depressed fastening position by the edge of the panel when mounted in the channels of the supporting frame.

The above mentioned and other features and objects of this invention and the manner of attaining them will become more apparent and the invention itself will be best understood by reference to the following description of an embodiment of the invention taken in conjunction with the accompanying drawings, wherein:

FIG. 1 is a front elevation of a sectional partition utilizing channel shaped supports for the sections and incorporating the present invention;

FIG. 2 is an enlarged sectional detail view taken substantially on a line II—II of FIG. 1;

FIG. 3 is an enlarged view partly in top plan and partly in section with a part broken away, illustrating a channeled supporting member connected at its opposite ends to channeled post members by means of the grip clips of the present invention;

FIG. 4 is a sectional detail view taken substantially on a line IV—IV of FIG. 3;

FIG. 5 is an enlarged vertical sectional view taken substantially on a line V—V of FIG. 4;

FIG. 6 is an enlarged exploded perspective view of the clip shown in the previous views and illustrating details of the several elements thereof;

FIG. 7 is a top plan view of the clip of FIG. 6 with the parts in assembled relation on a slightly reduced scale; and FIG. 1 is a side elevation of the clip with the parts in position to be assembled and slid into the end of a supporting channel.

Referring to the drawings, the invention has been illustrated as incorporated for use in a movable partition assembly such as shown generally at 20 in FIG. 1. The partition illustrated is inclusive of a plurality of vertical posts 22 and horizontal rails 24 which form a supporting framework for panel sections 26 of any desired material including glass, a glass panel being particularly shown at 26′. Posts 22 are generally mounted on bases 27 spaced at suitable intervals determined by the width of panels 26 or 26′. It has been found desirable to form posts 22 and rails 24 of metal extrusions of the same cross-section such as a C-shaped channel 23, having inwardly projecting flanges 28 the inner edges of which are spaced to provide an opening 29. As shown in FIGS. 2 and 5 the channel may be of double channel form, having an intermediate web or base wall 25.

It will be noted that the posts 22 and rails 24 are disposed at right angles, with the ends of rails 24 abutting the sides of posts 22 forming T joints. Accordingly, vertical and horizontal channel shaped members are provided which form a generally rectangular frame with the openings 29 in the channels facing inwardly to provide a panel seating groove that is substantially continuous. Heretofore, it has been customary to secure the posts and rails together by fasteners of a character requiring tools for their installation which is objectionable due to the labor involved not only during initial installation but also for subsequent maintenance.

By means of the present invention, the installation of partitions and like structures is greatly simplified. As particularly shown in FIG. 6, the fastener 30 is inclusive of three elements, a body member 32, a clamping member 34 and a pin 36. The body 32 has a channel portion 38 and a hook portion 40, the hook 40 being formed as an extension of the channel base 41. Upwardly from opposite sides of base 41 are projecting parallel flanges or side walls 42. At the juncture of base 41 and each flange 42 is a slot 44 having a notch portion 45 extending upwardly into the flange 42 intermediate the ends of the slot 44.

Clamping member 34 includes a lever arm 47 projecting from a transverse head portion 49 having spaced depending parallel leg portions 50 centrally apertured at 51. The end of each leg 50 is diagonally bevelled from both edges at 52 to form a pointed tooth or bite portion 54. When assembled with body 32, the head portion 49 is received between the flanges 42 so that legs 50 lie in slots 44, in which position the apertures 51 register with notches 45 to receive pin 36 serving as a pivot for the lever 34. Thus, legs 50 are projectable from the side of the plane of base 41 opposite to that from which flanges 42 project to produce a clamping action now to be described.

To assemble fastener 30 in an end of one of the channels 23, such as in rail 24, the lever 47 is raised to a generally vertical position as shown in FIG. 8, in which position the toothed portion 54 of each leg 50 is rocked upwardly to clear the web 25 of channel 23. The width of body 32 is such that fastener 30 may slide into channel 23 with slight clearance. Pin 36, being slightly longer than the width of body 32 is retained in place by the walls of channel 23, the fastener 30 being thus held in assembled relation upon being inserted into the channel 23. When fastener 30 approaches the position shown in FIGS. 3 and 4, the hook portion 40 may be aligned with and inserted in the opening 29 between flanges 28 of post 22 and rail 24 rotated so that the hook 40 engages behind the flanges 28. In this position the end of rail 24 abuts the face of post 22 and is so held until lever arm 47 is rocked downwardly through opening 29 between flanges 28 in rail 24. Such action causes teeth 54 to bite into web 25 of rail 24 which forces the upper or outer edges of flanges 42 into engagement with flanges 28, and simultaneously draws the hook 40 toward rail 24 pulling flanges 28 of post 22 into firm engagement with the end of rail 24.

When fasteners 30 have been so assembled in each end of rail 24 and posts 22 are secured to opposite ends of the rail, an inwardly facing panel receiving groove is provided which, by the alignment of openings 29 is substantially continuous, and capable of receiving a panel such as panel 26. The side edges of the panel 26 extend into the vertical grooves formed by openings 29, while the bottom edge of the panel 26 will rest on the top surfaces of levers 47 holding them in their locking position. The panel thus holds the fasteners 30 in fastening position so that they cannot be unlocked or released until the panel is removed.

In the case of glass panel 26' it may be of less thickness than the panels 26 as shown in FIG. 2, and accordingly such thinner panels 26' may be mounted between a pair of flanged rubber or resilient plastic strips 60.

If desired, the fastener or grip clip 30 of this invention, also may be used if the post 22 and strip or rail 24 are not joined at right angles, but intersect at another angle which may be provided for by a correspondingly angled corner of a panel, and also a correspondingly angled bevelled end of the channel member which holds the body of the fastener 30.

While there is described above the principles of this invention in connection with specific apparatus, it is to be clearly understood that this description is made only by way of example and not as a limitation to the scope of this invention.

What is claimed is:
1. A partition comprising:
   A. similar vertical and horizontal channel shaped members forming a rectangular frame having a substantially continuous inwardly open panel seating groove.
   B. means for frictionally fastening said horizontal members to said vertical members including
      (a) a pivoted cam member having a lever movable arcuately in said groove to fastening position, and
   C. a panel seated in said groove in engagement with said lever to retain said cam member in its fastening position.
2. A partition according to claim 1 in which the ends of the horizontal members abut the sides of the vertical members and said cam member draws said members into tight engagement.
3. A clamp for connecting a pair of channel members together at right angles comprising:
   A. a body portion positioned in an end of one channel member,
   B. A hook portion projecting from said body portion and engaging behind a flange of the other channel member, and
   C. a rockable lever operated cam means pivotally connected to said body portion for drawing said channels together by said hook portion and locking said body portion to said one channel member.
4. A clamping means for clamping a first channel member to a second channel member transverse thereof comprising:
   A. A clip member having
      (a) a rectangular bottom,
      (b) a pair of opposed upstanding side walls carried by said first channel member,
      (c) a slot in said bottom adjacent each side wall, and
      (d) hook means extending from said bottom for interlocking engagement with said second channel member, and
   B. a grip element having
      (a) spaced depending legs pivotally connected between the walls of said clip member, said legs having pointed extremities projectable through said slots to bite into said first channel member when said grip element is rocked on its pivotal connection, whereby said hook means draws said second channel member toward said first channel member.
5. A means for fastening two C-shaped cross-sectional channels together at an angle to each other comprising:
   A. a member part having:
      (a) a body portion extending into the end of one of said channels,
      (b) a hook portion projecting from said end into and behind a flange of the other of said channels, and
      (c) a projection extending from one side of the plane of said body portion; and
   B. a cam lever part pivoted to said projection having its cam portion projecting from the other side of the plane of said body portion to press said projection into engagement with a flange of said other channel and simultaneously to pull said one channel by means of said hook portion into engagement with the end of said one channel.
6. A fastening means according to claim 5 wherein said cam portion of said cam lever part includes a biting tooth.
7. A fastening means according to claim 5 wherein said cam lever part comprises:
   A. a wedging cam portion,
   B. a lever portion attached to said cam portion, and
   C. a pivot means for said lever portion journalled in said projection portion of body portion of said member.
8. A clamp for connecting a pair of channel members together at right angles comprising:
   A. a body portion having a pair of spaced flanges and positioned in an end of one channel member,
   B. a hook portion projecting from said body portion and engaging behind a flange of the other channel member, and
   C. cam means pivoted between said flanges of said body portion for drawing said channels together by said hook portion and locking said body portion to said one channel member.
9. A clamp for connecting a pair of channel members together at right angles comprising:
   A. a body portion positioned in an end of one channel member,
   B. a hook portion projecting from said body portion and engaging behind a flange of the other channel member, and
   C. a cam means pivotally connected to said body portion and rockable past dead center to a locking position for drawing said channels together by said hook portion and for locking said body portion to said one channel member.

References Cited by the Examiner
UNITED STATES PATENTS

| | | | |
|---|---|---|---|
| 2,703,635 | 3/1955 | Carlson | 189—36 |
| 2,914,147 | 11/1959 | Millard | 52—222 |
| 2,993,573 | 7/1961 | Bloedow | 189—36 |

JACOB L. NACKENOFF, Primary Examiner.

RICHARD W. COOKE, Examiner.